R. D. CLARK.
LUBRICATOR.
APPLICATION FILED MAR. 6, 1912.

1,035,156.

Patented Aug. 13, 1912.
3 SHEETS—SHEET 2.

WITNESSES
Samuell Payne
J. P. Appleman

INVENTOR
R. D. Clark
BY
ATTORNEYS

R. D. CLARK.
LUBRICATOR.
APPLICATION FILED MAR. 6, 1912.
1,035,156.
Patented Aug. 13, 1912.
3 SHEETS—SHEET 3.
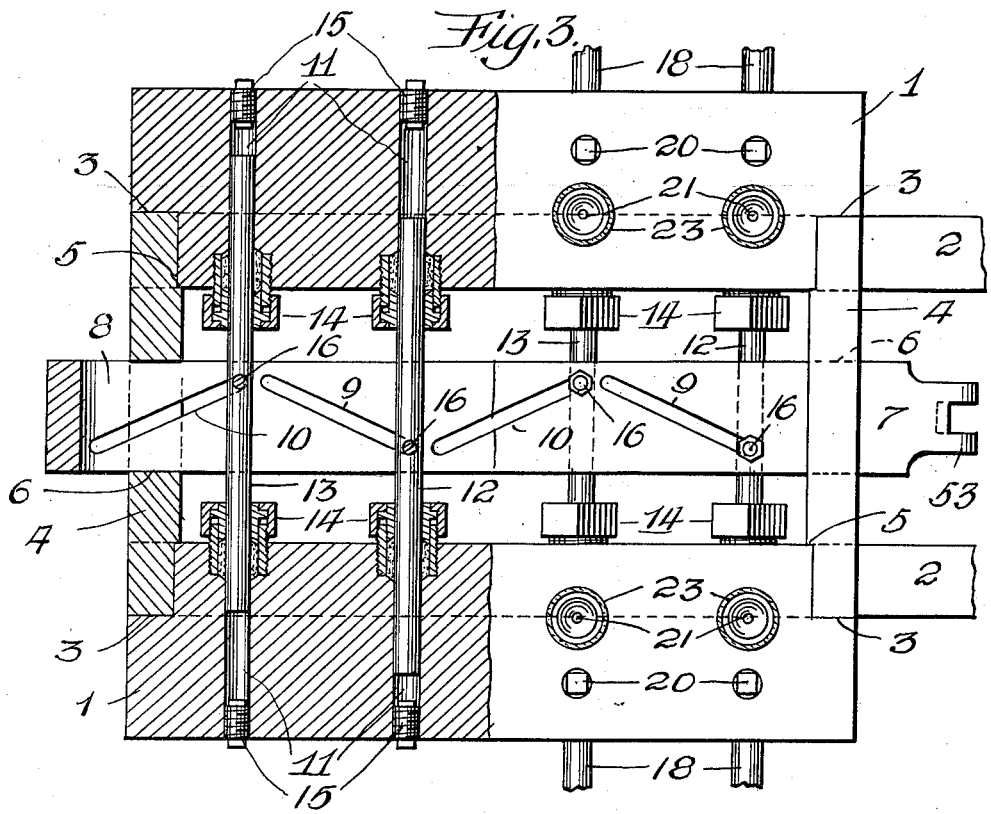
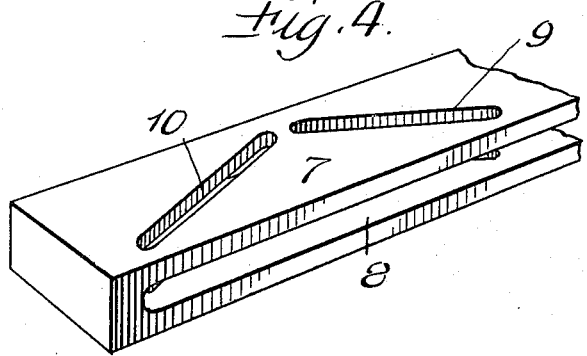
WITNESSES
INVENTOR
R. D. Clark.
BY
ATTORNEYS

UNITED STATES PATENT OFFICE.

ROBERT D. CLARK, OF DUQUESNE, PENNSYLVANIA.

LUBRICATOR.

1,035,156.  Specification of Letters Patent.  Patented Aug. 13, 1912.

Application filed March 6, 1912. Serial No. 681,943.

*To all whom it may concern:*

Be it known that I, ROBERT D. CLARK, a citizen of the United States of America, residing at Duquesne, in the county of Allegheny and State of Pennsylvania, have invented certain new and useful Improvements in Lubricators, of which the following is a specification, reference being had therein to the accompanying drawing.

This invention relates to lubricators, and my invention aims to provide:—first, a lubricator or lubricant pumping device having lubricant compartments from which lubricant can be intermittently and automatically discharged. Second, a lubricator that can be advantageously used in connection with an engine either of the stationary or portable type, the lubricator being automatically actuated to inject a quantity of lubricant into a cylinder or steam line, or upon a bearing or movable part of an engine. Third, a lubricator having a novel reservoir wherein positive and reliable means are located for controlling the supply of lubricant, thereby enabling an engineer to regulate the quantity of lubricant to be fed to a bearing, etc. Fourth, a lubricant pumping device that insures a uniform supply of lubricant being fed. Fifth, a lubricator or lubricant pumping device consisting of comparatively few parts easily and quickly assembled and not liable to injury by ordinary use.

My invention further aims to accomplish the above results by a combination of mechanical elements that will be hereinafter specifically described and then claimed, and reference will now be had to the drawings, wherein:—

Figure 1:
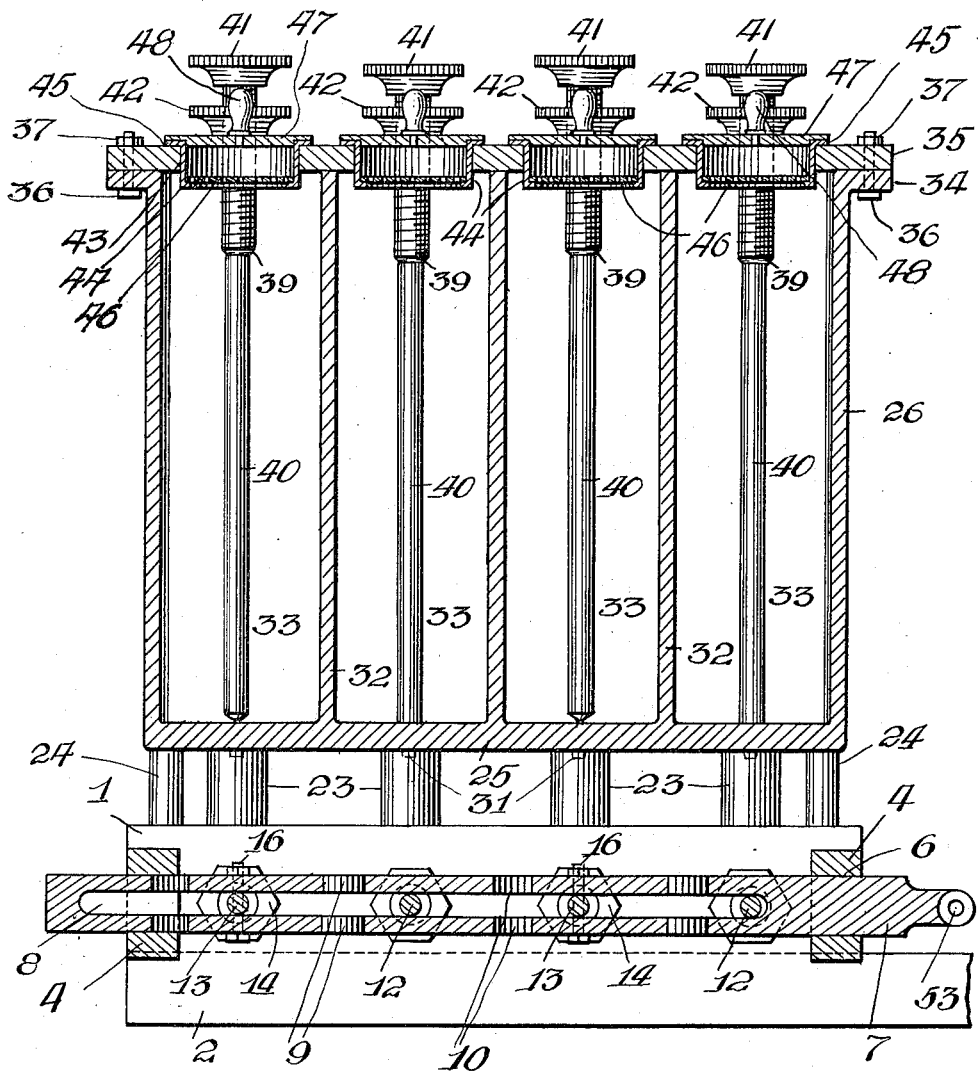
Figure 2:
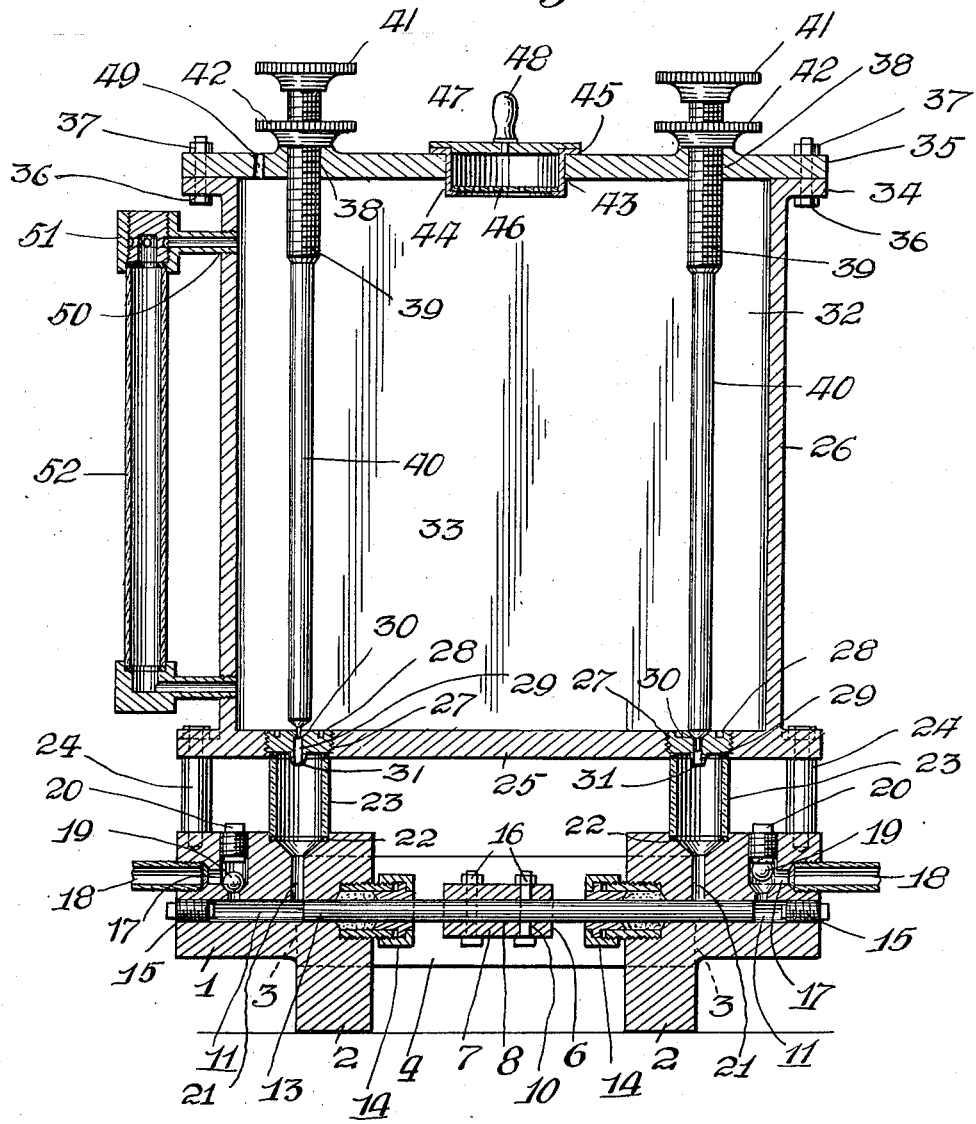

Figure 1 is a longitudinal scetional view of a lubricator in accordance with this invention, Fig. 2 is a cross sectional view of the same, Fig. 3 is a horizontal sectional view of a portion of the lubricator, and Fig. 4 is a perspective view of a portion of a slide forming part of the lubricator.

A lubricator in accordance with this invention comprises two horizontal and parallel pump bodies 1 having integral longitudinal supports 2 at the inner edges thereof and the ends of said bodies are provided with seats 3 for guide heads 4, said heads having shoulders 5 at the inner sides thereof spacing the pump bodies apart. The guide heads 4 are provided with longitudinally alining openings 6 and slidably mounted in said guide heads is a reciprocatory slide 7 that is provided with a horizontal slot 8 and the top and bottom walls thereof with angularly disposed slots 9 and 10, the slots 8 being disposed at an angle relatively to the slots 10.

The pump bodies 1 are provided with transversely alining bores 11 and slidably mounted in said bores are plungers 12 and 13. The plungers 12 and 13 extend through stuffing boxes 14 carried by the confronting sides of the pump bodies 1, and after said plungers are placed within the bores 11, the outer ends of the bores are closed by screw threaded plugs 15. The plungers 12 and 13 are provided with vertical bolts or pins 16 and the pins or plungers 12 and 13 ride in the angularly disposed slots 9 and 10 respectively.

The pump bodies 1 are provided with angle passages 17 in communication with the bores 11, adjacent to the plugs 15. The angle passages 17 are in communication with discharge pipes 18 tapped into the outer walls of the pump bodies 1, and located within said passages are gravity check valves 19 that close said passages and prevent a back flow of lubricant from the discharge pipes 18. After the check valves 19 have been placed within the passages, the upper ends of the passages are closed by screw plugs 20.

The pump bodies 1 are provided with vertical ports 21 in communication with the bores 11, said ports having the upper ends thereof flared and terminating in seats 22 for sight feed glasses 23.

The pump bodies 1 are provided with pedestals 24 in the form of sleeves and bolts and said bolts retain the base 25 of a rectangular lubricant reservoir 26 upon the pedestals 24. The base 25 of the reservoir has openings 27 to receive the upper ends of the sight feed glasses 23, and detachably mounted in said openings are screw plugs 28 having vertical ports 29, valve seats 30 and nipples 31 extending into the sight feed glasses.

The rectangular reservoir 26 has longitudinal integral equally spaced partitions 32 dividing the reservoir into four lubricant compartments 33. The partitions 32 correspond in height to the walls of the reservoir 26, and the upper edges of the walls are flanged, as at 34 to support a cover plate 35 that is secured to the flanges 34 by bolts 36 and nuts 37. The cover plate 35 has bosses provided with openings 38 that have the walls thereof screw threaded to receive the threaded portions 39 of valve stems 40. The lower ends of the stems 40 are tapered to engage the valve seats 30 and the upper ends of said valve stems are provided with knurled heads 41 and knurled jam nuts 42, said jam nuts locking the stems 40 after they have been adjusted.

The cover plate 35 is provided with filling openings 43 and arranged within said openings are sleeves 44 having the outer ends thereof flanged, as at 45 to rest upon the cover plate 35. The inner ends of the sleeves 44 support perforated plates or strainers 46 and closing the upper ends of said sleeves are detachable lids 47 having handles 48. The cover plate 35 has vents 49 to allow air to exhaust from the lubricant compartments.

The front wall of the reservoir 26 is provided with openings 50 into which are tapped gage heads 51 supporting a gage glass 52.

One end of the slide 7 has provision, as at 53, whereby it can be connected to a suitable operating means, and when the slide is reciprocated, the plungers 12 and 13 are shifted in opposite directions. Assuming that the valve stems 40 have been set to allow a quantity of lubricant to pass through the ports 29, sight glasses 23 and ports 21 into the bores of the pump bodies, the movement of the plunger in the bore closes one of the ports 21 and opens the other allowing a quantity of lubricant to pass into the open bore. As the plunger is moved again in the opposite direction, a quantity of the lubricant within the bore is forced into the angle passage 17, elevating the check valve 19 and passing into the discharge pipe 18.

By reference to Fig. 2 of the drawings, it will be observed that each of the lubricant compartments 33 has a filling opening 43, a vent 49, a gage glass 52 and two valve stems 40. The pump bodies, beneath the compartments, have sets of alternately operating check valves and the plunger associated with each set of check valves, beneath a lubricant compartment, is continuously pumping lubricant, first from one of the pump bodies and then from the other. Either one of the lubricant compartments can be filled without a cessation in the operation of the lubricator and the quantity of lubricant being fed readily determined.

Instead of using separate oil cups for the various parts of an engine, my lubricator can be installed and the discharge pipes 18 extended to the parts to be lubricated.

It is thought that the operation and utility of the lubricator will be apparent without further description, and while in the drawing there is illustrated a preferred embodiment of the invention, it is to be understood that the structural elements thereof are susceptible to such changes as fall within the scope of the appended claims.

What I claim is:—

1. A lubricator comprising pump bodies having bores formed therein, discharge pipes in communication with the bores of said pump bodies, a reciprocatory slide movably arranged between said pump bodies, plungers extending through said slide into the bores of said pump bodies and adapted to be shifted in said bores to force lubricant into said discharge pipes, and a reservoir having lubricant compartments formed therein in communication with the bores of said pump bodies.

2. A lubricator comprising pump bodies having bores formed therein, discharge pipes in communication with the bores of said pump bodies, a reciprocatory slide movably arranged between said pump bodies, plungers extending through said slide into the bores of said pump bodies and adapted to be shifted in said bores to force lubricant into said discharge pipes, a reservoir having lubricant compartments formed therein in communication with the bores of said pump bodies, means arranged in said pump bodies and controlling the communication between said discharge pipes and the bores of said pump bodies for preventing a back flow of lubricant.

3. A lubricator comprising pump bodies having bores formed therein, discharge pipes in communication with the bores of said pump bodies, a reciprocatory slide movably arranged between said pump bodies, plungers extending through said slide into the bores of said pump bodies and adapted to be shifted into said bores to force lubricant into said discharge pipes, a reservoir having lubricant compartments formed therein in communication with the bores of said pump bodies, means arranged in said pump bodies and controlling the communication between said discharge pipes and the bores of said pump bodies for preventing a back flow of lubricant, and means arranged within the lubricant compartments of said reservoir for controlling the supply of lubricant to the bores of said pump bodies.

In testimony whereof I affix my signature in the presence of two witnesses.

ROBERT D. CLARK.

Witnesses:
KARL H. BUTLER,
MAX H. SROLOVITZ.

Copies of this patent may be obtained for five cents each, by addressing the "Commissioner of Patents, Washington, D. C."